United States Patent [19]

Stavinoha et al.

[11] Patent Number: 4,789,602

[45] Date of Patent: Dec. 6, 1988

[54] HYDROXYETHYLNORBORNENE COMPOUNDS AND A PROCESS FOR THEIR PREPARATION

[75] Inventors: Jerome L. Stavinoha; Anthony W. McCollum, both of Longview, Tex.

[73] Assignee: Eastman Kodak Company, Rochester, N.Y.

[21] Appl. No.: 101,472

[22] Filed: Sep. 28, 1987

[51] Int. Cl.$^4$ .................. B05D 3/02; B32B 27/06; B32B 27/36; C08G 63/02
[52] U.S. Cl. .................. 428/480; 427/385.5; 528/298; 528/272
[58] Field of Search .................. 427/385.5; 428/480, 428/482; 528/272, 298

[56] References Cited

U.S. PATENT DOCUMENTS

| | | | |
|---|---|---|---|
| 4,370,191 | 1/1983 | Uekita et al. | 428/482 X |
| 4,379,801 | 4/1983 | Weaver et al. | 428/482 X |
| 4,410,686 | 10/1983 | Hefner et al. | 528/298 X |
| 4,471,101 | 9/1984 | Hefner et al. | 528/298 X |

*Primary Examiner*—Micheal Lusignan
*Attorney, Agent, or Firm*—Thomas R. Savitsky; William P. Heath, Jr.

[57] ABSTRACT

Novel hydroxyethylnorbornene esters are disclosed which are prepared by reacting cyclopentadienylethanol with an acrylate ester. Novel polyesters are disclosed which are prepared by the self-polymerization of the hydroxyethylnorborane (HEN) esters. Novel polyesters are also obtained by reacting HEN compounds and a diol or other polyol in the presence of diacids or their esters or anhydrides. The polyesters of the present invention are useful as tackifying agents, adhesives, coatings, and for other purposes.

6 Claims, No Drawings

HYDROXYETHYLNORBORNENE COMPOUNDS AND A PROCESS FOR THEIR PREPARATION

FIELD OF THE INVENTION

The present invention relates to novel compounds which contain or are derived from hydroxyethylnorbornenes, and a process for their preparation.

BACKGROUND OF THE INVENTION

Esters, anhydrides, and polyesters are commonly used for a wide variety of purposes in the chemical arts. These compounds have possible applications as tackifying agents, diluents, thermosetting adhesives, curable coatings, or as intermediates for these and other important products. It is thus desirable to obtain novel esters, anhydrides and polyesters which can be used in many different ways, and to prepare polyesters which exhibit superior characteristics, such as greater flexibility and impact resistance when used as coatings.

SUMMARY OF THE INVENTION

In one aspect of the invention, novel hydroxyethylnorbornene (HEN) esters are prepared by reacting cyclopentadienylethanol (CPDE) with acrylate esters. These HEN esters can be made into novel polyesters by self-polymerization. Polyesters can also be obtained from the HEN esters by reacting them with diols or polyols in the presence of diacids or their esters or anhydrides. In another aspect of the present invention, novel hydroxyethylnorbornene compounds are provided which are prepared by reacting CPDE with various dienophilic olefins such as maleic anhydride, acrylic acid, acrylonitrile, acrolein, and alkyl or aryl fumarate. These novel HEN compounds can also be polymerized in the same manner as the HEN esters described above. The polyesters of the present invention exhibit superior characteristics with regard to flexibility and impact resistance, and are useful as tackifying agents, coatings, or adhesives.

DETAILED DESCRIPTION OF THE INVENTION

The novel compositions of the present invention comprise those compounds which contain or which are derived from hydroxyethylnorbornene. One such compound comprises a hydroxyethylnorbornene (or HEN) ester having the formula

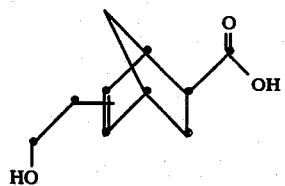

wherein R represents an aromatic or aliphatic, branched or unbranched hydrocarbon containing from 1 to 25 carbon atoms. Two particularly preferred R groups are methyl, which forms the compound carbomethoxy-hydroxyethylnorbornene, and ethyl, which forms carboethoxy-HEN. Other suitable R groups include propyl, isopropyl, butyl, pentyl, benzyl, toluyl, and phenyl.

The HEN esters of Formula I above are prepared by reacting acrylate esters with a cyclopentadienylethanol (or CPDE) having the formula:

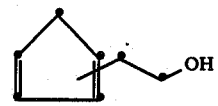

This formula is drawn to indicate that the CPDE is a mixture of 1- and 2-beta-hydroxyethyl substituted cyclopentadienes. The preparation of CPDE has been described previously in Schroder et al., *J. Prakt. Chem.*, 315, 958 (1973). Examples of acrylate esters which can be reacted with CPDE include methyl acrylate, ethyl acrylate, butyl acrylate, methyl methacrylate, and methyl crotonate. This reaction is exothermic, and is preferably carried out by combining the reactants and allowing the solution to attain a temperature of about 50° C. This temperature can be maintained using an ice bath until complete conversion of the CPDE occurs, and the temperature starts to drop. A typical molar ratio of compound of Formula II to acrylate ester is from about 1:1 to about 1:5 with about equimolar being preferred.

Another monomeric compound of the present invention comprises a HEN compound having the formula:

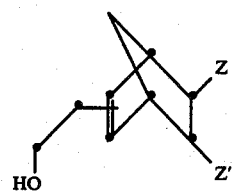

wherein Z and Z' are selected from the group consisting of hydrogen, COOH, CN, COH, and COOR, and R is an aliphatic or aromatic hydrocarbon, with the proviso that Z and Z' both not be hydrogen and when Z and Z' are linked by an oxygen, they form an anhydride group.

This HEN compound is prepared by reacting a CPDE with a dienophilic olefin, such as maleic anhydride, acrylic acid, acrylonitrile, acrolein, or alkyl or aryl fumarate. This reaction is preferably carried out in a tetrahydrofuran solution at a temperature of about 5° to 20° C. A typical molar ratio of CPDE to olefin is from about 1:1 to about 1:5 with about equimolar being preferred.

An example of an HEN compound of Formula III above is hydroxyethylnorbornene dicarboxylic anhydride. This compound is formed when CPDE is racted with maleic anhydride.

The HEN esters of Formula I above can be combined with diols, triols, or other polyols to form novel monomeric adducts. These adducts are prepared by heating a mixture of a HEN ester and a polyol at temperatures of about 160° to 200° C. The adducts can be end-capped by addition of a conventional capping group, such as alkyl lineoleate, at similar temperatures. One example of a polyol suitable for forming an adduct when a HEN ester is trimethylolpropane. Other suitable polyols include butanediol, pentanediol, neopentyl glycol, ethylene glycol, and pentaerythitol.

The present invention also comprises polymeric compounds which contain or are derived from hydroxyethylnorbornene. One such polymeric composition comprises a polyester with recurring units having the formula:

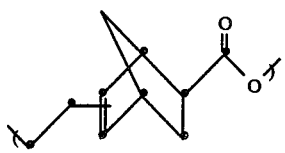
(IV)

The polyester is prepared by the self-polymerization of the HEN esters of Formula I above. The HEN esters are preferably reacted at temperatures from about 160° to 200° C. for at least about 10 hours. The resulting polyesters have molecular weights from about 1,000 to about 4,000. It is also possible to employ a catalyst to speed up the reaction if desired. One catalyst usable in the above self-polymerization reaction is dibutyltin oxide.

The polyester which comprises recurring units of Formula IV can be end capped by heating a HEN ester of Formula I in the presence of a conventional capping group, such as an alkyl linoleate. The end-capped polyester is preferably prepared at a temperature of 160° to 200° C., and generally will have molecular weights lower than 1,500.

Polyesters of the formula:

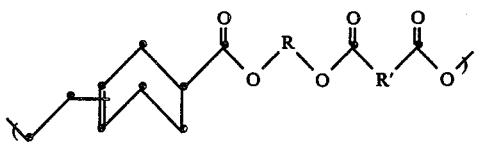
(V)

wherein each R is, independently, a straight or branched chain aliphatic group of 2 to 12 carbon atoms or an aromatic group of 6 to 12 carbon atoms and R' is a straight or branched chain aliphatic group of 0 to 12 carbon atoms or an aromatic group of 6 to 12 carbon atoms, are also within the scope of the present invention.

Polyesters of Formula V above can be prepared by reacting hydroxyethylnorbornene esters of Formula I above and diols or other polyols with a compound selected from the group consisting of diacids, their esters or anhydrides, and mixtures thereof. Reaction temperatures of about 160° to 200° C. are preferred and a suitable catalyst such as dibutyltin oxide may be employed. A typical reaction period of about 3 to 8 hours depending on the reactants. The molar ratio of compound of Formula I to diacids, their ester or anhydrides and mixtures thereof is typically from about 2:1 to about 5:1, with about 3:1 being preferred. The molar ratio of diol or other polyol to diacids, their esters or anhydrides, and mixtures thereof is typically from about 1.05:1 to about 1.35:1, with about 1.2:1 being preferred. Polymers produced by this reaction comprise film and fiber forming polyesters of molecular weights from about 1,000 to 5,000.

Examples of diesters and anhydrides suitable in the above reaction are dimethyl adipate, dimethyl terephthalate, phthalic anhydride, succinic anhydride, and maleic anhydride.

Polyols usable in the invention include neopentyl glycol (NPG), ethylene glycol, 2,2,4-trimethyl 1,3-pentanediol (TMPD), trimethylolpropane, pentaerythitol, 1,4-butanediol, 1,2-propanediol, 1,3-propandediol and 1,6-hexanediol.

Examples of polyesters produced by the condensaton reaction of HEN esters and the compounds discussed above include those with the following repeating units:

Carboxy-hydroxyethylnorbornene (or CHEN) neopentyl glycol maleate; CHEN neopentyl glycol adipate maleate; CHEN terephthalate, CHEN neopentyl glycol phthalate; CHEN neopentyl glycol terephalate; and CHEN butanediol terephthalate.

It is particularly preferred to prepare polyesters by reacting HEN esters with a mixture comprising a diester and a polyol. Any of the above mentioned diesters and polyols can be combined and reacted with a HEN ester to produce a film and fiber forming polyester.

Additionally, polyesters can be formed by reacting the HEN compounds of Formula III with a diol or other polyol in the presence of a compound selected from the group consisting of diacids, their esters or anhydrides, and mixtures thereof. The reaction is preferably carried out at a temperature of from about 160° to 200° C., and produces a film and fiber forming polyester of molecular weights from about 1,000 to about 4,000. A typical molar ratio of diol or other polyol to diacids, their esters or anhydrides, and mixtures thereof is from about 1:1 to about 3:1 with about 2:1 being preferred. A typical molar ratio of compound of Formula III and diacids, their esters of anhydride, and mixtures thereof is from about 1:1 to about 3:1 with about 2:1 being preferred. One example of a polymer formed in this reaction is HEN dicarboxylic anhydride (HENDA) neopentyl glycol maleate, which is formed by reacting HENDA with neopentyl glycol and maleic anhydride at a temperature of about 180° to 190° C.

The polyesters of the present invention can be used as tackifying agents, thermoset adhesives, reactive diluents, and air-dry and low temperature curable coatings. The coatings can be prepared in any conventional fashion, but are preferably prepared by dissolving the polyesters in a solvent. An example of a solvent usable in the present invention is a 70 to 30 percent solution of toluene and ethylene glycol monoethyl ether acetate. This coating solution can then be applied onto an article in any suitable in any fashion, such as spraying, and the coat is cured by heating at temperatures of about 150° to 200° C. Typically, a free radical initiator, such as benzoyl peroxide is used as a promoter. The percentage of solids in the coatings can range from about 10° to about 40%, with a 30% solids percentage preferred.

The following examples are set forth as illustrative of the present invention and are presented to more clearly show the principles and practice of the invention.

EXAMPLE 1

Preparation of Carbomethoxy-(2-hydroxyethyl)norbornene

Methyl acrylate (516 grams, 6.0 moles) and CPDE (165 grams, 1.5 moles) are placed in a 1-liter flask. The mixture is stirred, and an exothemic reaction takes place which is allowed to continue without any external cooling until the temperature reaches 50° C. This temperature is maintained with the aid of an ice bath. The bath is removed when the temperature drops below 40° C., and the mixture is stirred for an additional 2 hours. The total reaction time is 3 hours. GLC analysis indicates complete conversion of CPDE. Excess methyl acrylate is removed on a rotary evaporator at 1.5 mm HG (bath temperature to 50° C.). CHEN (280 grams, 95 percent yield) is obtained in 95 percent purity. The $^1$H NMR, $^{13}$C NMR, and IR spectra are in complete accord with the structural assignment.

EXAMPLE 2

Preparation of Carboethoxy-(2-hydroxyethyl)norbornene

Ethyl acrylate (600 grams, 6.0 moles) and CPDE (165 grams, 1.5 moles) are placed in a 2-liter flask. The exothermic reaction is kept in the 50° to 55° C. range by the intermittent use of an ice bath. When the temperature drops below 40° C., the ice bath is removed and the mixture is left stirring for several hours. The excess ethyl acrylate is removed on a rotary evaporator at 2 mm Hg (bath temperature, 60° C.). The crude product is then flash distilled through a Claisen-head apparatus (292 grams, 94 percent yield) in 96 percent purity. The $^1$H NMR, $^{13}$C NMR, and IR spectra are in complete accord with the assigned structure.

EXAMPLE 3

Preparation of Poly(Carboxy-(2-hydroxyethyl)norbornene)

Carbomethoxy-(2-hydroxyethyl)norbornene (88 grams, 0.45 mole) and dibutyltin oxide (0.17 grams) are charges into a resin cook apparatus fitted with a nitrogen ebulator, thermometer, mechanical stirrer, and Dean Stark trap fitted with condensor. The mixture is heated at 180° to 185° C. for 10 hours. A conversion of 75 percent is obtained based on methanol taken overhead. The tacky polyester has a hydroxyethylnorbornenel number of 21 and an average molecular weight of 1,946.

EXAMPLE 4

Preparation of Poly(Carboxy-(2-hydroxyethyl)norbornene)

Carboethoxy-(2-hydroxyethyl)norbornene (93 grams, 0.44 mole) and dibutyltin oxide (0.19 grams) are charged into a resin cook apparatus. The mixture is heated at 180° to 185° for 24 hours and then for 1 hour at 210° to 215° C. under slightly reduced pressure. A conversion of 93 percent is obtained based on the ethanol taken overhead. The average molecular weight of the polyester is 2,812.

EXAMPLE 5

Preparation of Poly(Carboxy-(2-hydroxyethyl)norbornene)

Carboethoxy-(2-hydroxyethyl)norbornene (94.8 grams, 0.45 mole) and dibutyltin oxide are placed in a resin cook apparatus. The mixture is heated at 180° to 185° C. for 16 hours. The mixture is then heated at 180° to 185° C. for 3 hours under 0.5 mm Hg. A conversion of 94 percent is obtained based on the ethanol taken overhead. The average molecular weight of the polyester is 3,565.

EXAMPLE 6

Preparation of Poly(CHEN-NPG maleate)

A resin cook apparatus is charged with carbomethoxy-(2-hydroxyethyl)norbornene (50 grams, 0.26 mole), maleic anhydride (25 grams, 0.26 mole), NPG (29 grams, 0.28 mole), and dibutyltin oxide (0.21 gram). The mixture is heated at 180° to 190° C. for 5.5 hours. A conversion of 62 percent is obtained based on the water and methanol taken overhead. The polyester has a hydroxyethylnorbornenel number of 74.

EXAMPLE 7

Preparation of Poly(CHEN-NPG adipatemaleate)

A resin cook apparatus is charged with carbomethoxy-(2-hydroxyethyl)norbornene (50 grams, 0.26 mole), dimethyl adipate (13.3 grams, 0.076 mole), maleic anhydride (17.5 grams, 0.18 mole), NPG (29.2 grams, 0.28 mole), and dibutyltin oxide (0.22 grams). The mixture is heated at 180° to 190° C. for 7 hours. A conversion of 72 percent is obtained based on the methanol taken overhead.

EXAMPLE 8

Preparation of Poly(CHEN-NPG terephthalate

A resin cook apparatus is charged with carboethoxy-(2-hydroxyethyl)norbornene (55 grams, 0.26 mole), NPG, (10 grams, 0.10 mole), dimethyl terephthalate (17.1 grams, 0.087 mole), and dibutyltin oxide (0.16 gram). The mixture is stirred for 7 hours at 180° to 190° C. A converson of 72 percent is obtained based on the ethanol and methanol taken overhead.

EXAMPLE 9

Preparation of Linoleate-capped Poly(Carboxy-HEN)

A resin cook apparatus is charged with carbomethoxy-(2-hydroxyethyl)norbornene (50 grams, 0.26 mole), methyl linoleate (37.9 grams, 0.13 mole), and dibutyltin oxide (0.18 gram). The mixture is heated at 180° C. for 6.5 hours. A conversion of 78 percent is achieved on the mechanol taken overhead.

EXAMPLE 10

Preparation of Linoleate-capped Carboxy-HEN-TMP

A resin cook apparatus is charged with carbomethoxy-(2-hydroxyethyl)norbornene (64 grams, 0.33 mole), trimethylolpropane (TMP) (13.2 grams, 0.099 mole), and dibutyltin oxide (0.15 gram). The mixture is reacted at 180° C. until 72 percent of the theoretical methanol has been collected overhead. The mixture is cooled and 97 grams of methyl linoleate (0.33 mole) are added. The mixture is again heated at 180° to 190° C. for about 4 hours. A conversion of 74 percent is obtained based on the methanol taken overhead. The average molecular weight of the linoleate is 1,055.

EXAMPLE 11

Preparation of Poly(HEN dicarboxylic anhydride NPG maleate)

CPDE (55 grams, 0.5 mole) and tetrahydrofuran (THF) (10 mL) are placed in a 500-mL, three necked flask fitted with a mechanical stirrer, additional funnel, and thermometer. Maleic anhydride (73.5 grams, 0.75 mole) in 85 grams of THF is added with stirring over a 2-hour period. An ice bath is used to maintain the temperature in the 5° to 20° C. range (mainly 10° C.). The mixture is allowed to stir at room temperature for 30 minutes. The addition funnel is removed and NPG (57.2 grams, 0.55 mole) and dibutyltin oxide (0.37 grams) are added. A Dean-Stark trap is added and the mixture is heated with an oil bath to remove THF. When the pot temperature reaches 150° C., an $N_2$ ebulator is added to the system. The mixture is then heated at 180° to 190° C.

for 5 hours. The acid number of the resulting polyester is 36.

What is claimed is:

1. A process for coating an article, which comprises:
   (a) dissolving in a suitable solvent the polyester comprising an effective amount of recurring units of the formula:

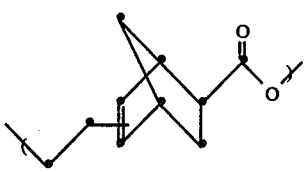

said polyester having a molecular weight of 1,000 to 4,000, to obtain a mixture;
   (a) applying the mixture onto the article; and
   (b) curing at a temperature of 150° to 200° C.

2. An article coated by the process of claim 1.

3. A process for coating an article comprising:
   (a) dissolving in a suitable solvent a polyester comprising an effective amount of recurring units of the formula:

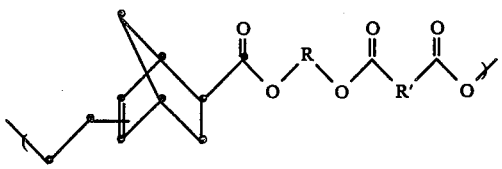

wherein R and R' represent aliphatic or aromatic hydrocarbons, branched or unbranched, containing from 1 to 25 carbon atom, said polyester having a molecular weight of from about 1,000 to 5,000, to obtain a mixture;
   (b) applying the mixture onto the article; and
   (c) curing at a temperature of 150° to 200° C.

4. An article coated by the process of claim 3.

5. A process for coating an article comprising:
   (a) dissolving in a suitable solvent a polyester comprising an effective amount of the condensation product of a hydroxyethylnorbornene compound of the formula:

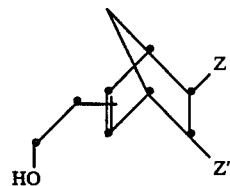 (III)

wherein Z and Z' are selected from the group consisting of hydrogen, COOH, CN, COH and COOR, and R is an aliphatic or aromatic hyrocarbon, with the proviso that Z and Z' both not be hydrogen, and when Z and Z' are linked by an oxygen, they form an anhydride group,
   a diol or polyol, a compound selected from the group consisting of diacids, their esters or anhydrides, and mixtures thereof, to obtain a mixture;
   (b) applying the mixture onto the article; and
   (c) curing at a temperature of 150° to 200° C.

6. An article coated by the process of claim 5.

* * * * *